(12) United States Patent
Cheng et al.

(10) Patent No.: US 9,073,765 B2
(45) Date of Patent: Jul. 7, 2015

(54) METHOD TO REMOVE ORGANIC POLLUTANTS THROUGH COUPLING MICROWAVE DEGRADATION BASED ON MICROPOROUS MINERAL ADSORPTION

(75) Inventors: Hefa Cheng, Guangzhou (CN); Erdan Hu, Guangzhou (CN)

(73) Assignee: Guangzhou Institute of Geochemistry, Chinese Academy of Sciences, Guangdong (KR)

( * ) Notice: Subject to any disclaimer, the term of this patent is extended or adjusted under 35 U.S.C. 154(b) by 0 days.

(21) Appl. No.: 13/884,996

(22) PCT Filed: Feb. 11, 2012

(86) PCT No.: PCT/CN2012/071042
§ 371 (c)(1),
(2), (4) Date: Oct. 11, 2013

(87) PCT Pub. No.: WO2013/107063
PCT Pub. Date: Jul. 25, 2013

(65) Prior Publication Data
US 2014/0027381 A1    Jan. 30, 2014

(30) Foreign Application Priority Data
Jan. 19, 2012  (CN) .......................... 2012 1 0017345

(51) Int. Cl.
*C02F 1/28* (2006.01)
*C02F 1/30* (2006.01)
*C02F 101/30* (2006.01)
*C02F 101/34* (2006.01)
*C02F 101/36* (2006.01)

(52) U.S. Cl.
CPC ................. *C02F 1/281* (2013.01); *C02F 1/302* (2013.01); *C02F 2101/30* (2013.01); *C02F 2101/306* (2013.01); *C02F 2101/345* (2013.01); *C02F 2101/36* (2013.01); *C02F 2303/16* (2013.01)

(58) Field of Classification Search
USPC ............................. 210/662, 670, 748.07, 175
See application file for complete search history.

(56) References Cited

U.S. PATENT DOCUMENTS 7,230,218 B2 *  6/2007  Roussy .......................... 219/697
7,662,295 B2 *  2/2010  Arato et al. .................... 210/762

FOREIGN PATENT DOCUMENTS

AU     2010224357 A1    10/2010

OTHER PUBLICATIONS

Abstract of Chinese Patent—CN101643205, Feb. 10, 2010, 1 page.
Abstract of Chinese Patent—CN101786750, Jul. 28, 2010, 1 page.
Abstract of Chinese Patent—CN102050532, May 11, 2011, 1 page.
international Search Report for PCT/CN2012/071042 dated Nov. 1, 2012, 3 pages.

* cited by examiner

*Primary Examiner* — Chester Barry
(74) *Attorney, Agent, or Firm* — Dority & Manning, P.A.

(57) ABSTRACT

This invention discloses a kind of method to remove organic pollutants through coupling microwave degradation based on microporous mineral adsorption. It consists of the following major steps: Fill hydrophobic porous mineral adsorbent into the adsorption column to adsorb organic pollutants in the organic wastewater, and start up the microwave generator after the adsorbent reaches saturation so that the organic pollutants adsorbed inside the adsorption column can be degraded under microwave induction. With the alternative operation and regeneration of two adsorption columns, the organic wastewater can be treated continuously. In the invention, with the technologies of microwave-induced degradation through hydrophobic microporous mineral coupling adsorption, organic pollutants can be removed from water efficiently, and the degradation process and carrier can be circulated. The pollutants can be mineralized into non-toxic and harmless micromolecular substance completely.

5 Claims, 1 Drawing Sheet

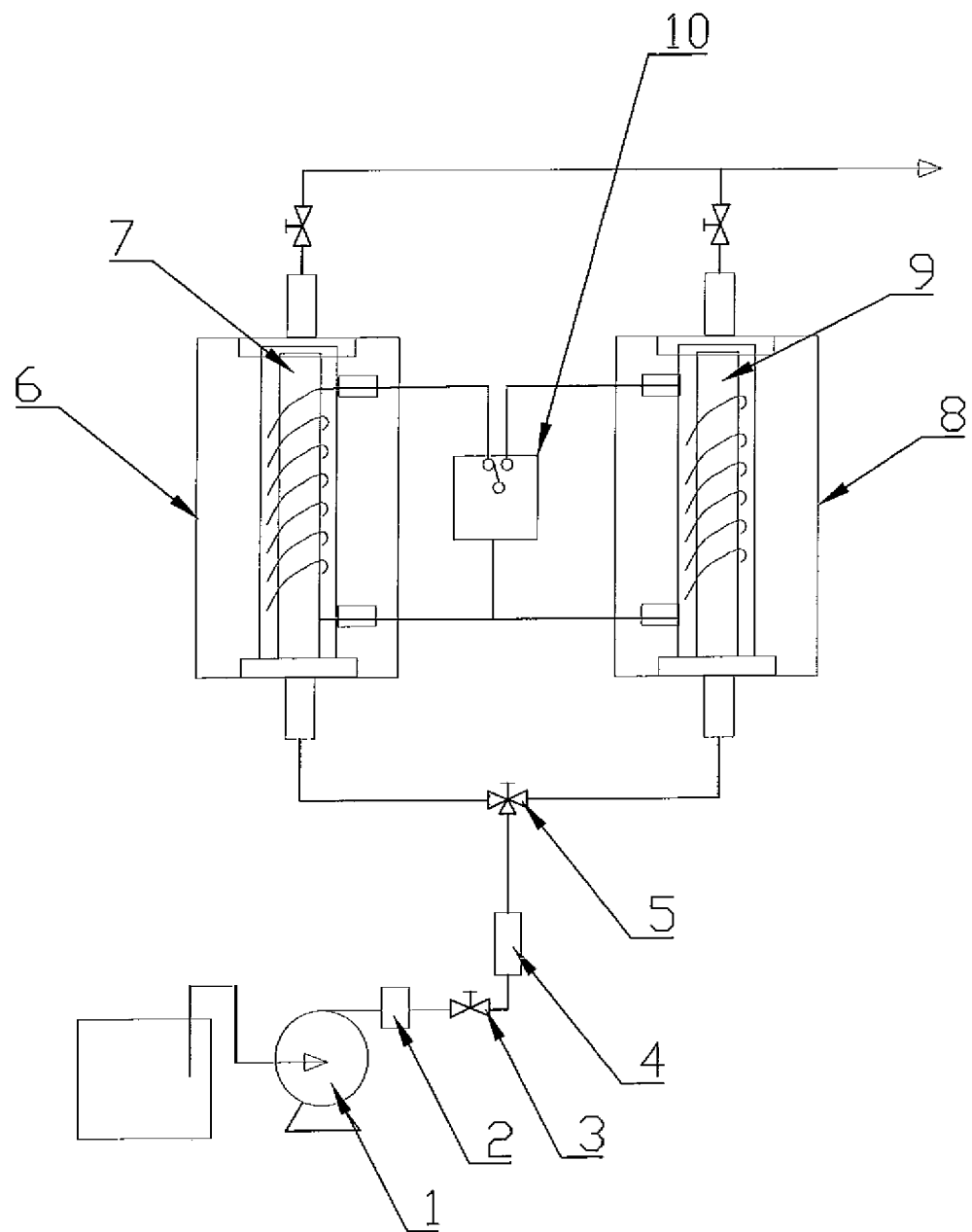

METHOD TO REMOVE ORGANIC POLLUTANTS THROUGH COUPLING MICROWAVE DEGRADATION BASED ON MICROPOROUS MINERAL ADSORPTION

CROSS REFERENCE TO RELATED APPLICATION

This application is the national stage entry of International Patent Application No. PCT/CN2012/071042 having a filing date of Feb. 11, 2012, which claims priority to and the benefit of Chinese Patent Application No. 201210017345.9 filed in the Chinese Intellectual Property Office on Jan. 19, 2012, the entire contents of which are incorporated herein by reference.

FIELD OF THE INVENTION

The invention relates to a kind of method to remove organic pollutants, especially a kind of method to remove organic pollutants through coupling microwave degradation based on microporous mineral adsorption.

BACKGROUND OF THE INVENTION

With the fast social and economic development and the improving standard of living of people, the pollution of toxic substance, especially the organic matters which are hard to degrade, to the natural environment gets aggravated. The wastewater of such industries as dyeing and printing, pharmacy, and chemical, garbage leachate and urban sewage sludge may all contain a great number of organic matters which are hardly degradable. As such pollutants are not easy to degrade, they may exist for a long period in environment, impacting regional or global environment with the conveying by air and water. They may finally impair the health of human beings seriously by way of food chain enrichment. The pollution of water is one of the serious environmental problems at present.

To remove organic pollutants from water is one of the hottest research subjects in the field of water treatment. With unremitting efforts of specialists in environmental science for dozens of years, a large group of effective treatment processes have been developed. Nonetheless, the existing treatment technologies, such as advanced oxidation and microbial degradation, fail to meet the requirements of pollution control due to the restrictions of such shortcomings as low treatment efficiency, high cost, production of secondary pollution, and incomplete degradation. In particular, for the treatment of wastewater of high concentration, the above methods can hardly be applied in a large scale due to disadvantages of large site area, stringent operation conditions, low adaptability, and low removal efficiency. As active carbon adsorption boasts significant advantages in treating the organic matters which are difficult to get degraded by bio-chemical process or soluble organic matters which can hardly be oxidated in the ordinary oxidation process, it is often employed in the treatment of organic wastewater of high concentration which is hard to degrade. In particular, with the increasing requirements for the treatment degree of wastewater and wastewater recycling rate in recent years, great importance has been attached to this efficient treatment process generally. For instance, the treatment of wastewater containing oil, phenol, nitro compound, chlorine-radical or nitro substituted aromatic compound, heterocyclic compound, synthetic dyes and DDT, etc. However, the holes of active carbon (including tiny, middle and large holes) are in extensive distribution, so its adsorption lacks selectivity. Additionally, active carbon is of high hydrophilicity, so the efficiency to adsorb organic pollutants in water is low. The active carbon after adsorption will generally be regenerated by heating for recycling. In the conventional thermal regeneration, active carbon would get lost significantly in the process of regeneration, and the adsorbing capability of the regenerated active carbon would decline obviously. In addition, the tail gas produced upon the regeneration would cause such problems as secondary pollution to the atmosphere. Compared with the conventional thermal treatment, microwave treatment boasts significant advantages in the regeneration of active carbon. As active carbon has a high capability in absorbing microwave, its temperature will rise quickly under microwave, and the heated pollutants adsorbed on the surface will get degraded and desorbed. Nonetheless, the microwave energy will cause great damage to active carbon, so it is only suitable for short-term treatment. To be exposed to the microwave radiation for a long period will lead the surface of active carbon to catch fire and the hole structure after regeneration will also be destructed. As a result, the specific surface area will decrease significantly. Besides, because the active carbon has a strong capability in absorbing microwave, the microwave energy cannot penetrate active carbon deeply and the adsorption column cannot be heated evenly. As a result, it can be often found that some active carbon in some space cannot be regenerated or be regenerated completely as no microwave radiation reaches, whereas some other has its temperature risen too high and gets the structure damaged seriously. As active carbon absorbs microwave energy, the penetrability of microwave in the active carbon layer is very poor. This greatly limits the size of adsorption column. Therefore, it remains a hard nut for us to treat the organic pollutants, especially persistent organic matters, in water. We should keep on exploring and researching in the area. It is of great significance to protecting water environment and reducing risks to the health of human to design and develop new technologies to degrade organic pollutants with a view to removing organic pollutant effectively while not causing secondary pollution and applying such technologies in the treatment of organic pollutants in water successfully.

DESCRIPTION OF THE INVENTION

The invention aims to provide a kind of method to remove organic pollutants through coupling microwave degradation based on microporous mineral adsorption. The method is highly efficient, energy-conserving, time-saving, simple to operate, and free of secondary pollution.

The scheme of the invention to solve technical problems: the method to remove organic pollutants through coupling microwave degradation based on microporous mineral adsorption includes the following steps:

1) Fill mineral-radical hydrophobic porous adsorbent into the first adsorption column and the second adsorption column, with a layer of microwave coil wrapping on the external surface of both of the two columns respectively;
2) Start up the water pump, draw out the organic wastewater from water container, remove the insoluble substance through the filtering apparatus, enter the first reactor through the intake of the first reactor after going through the total control valve, flow meter, and changeover valve, stay inside the first adsorption column in the reactor for a period long enough so that the organic pollutants can reach a balance with the adsorption of mineral-radical hydrophobic porous adsorbent, and lead the treated wastewater from the outlet of the first reactor;

3) Test the concentration of organic pollutants in the water flowing out of the outlet of the first reactor at intervals, start up the changeover switch to switch the water flow to the intake of the second reactor when the concentration reaches the preset value, and adsorb organic pollutants with the second adsorption column inside the second reactor;
4) Start up the microwave generator, connect it to the microwave coil on the first adsorption column, and adjust the microwave emitting energy to an appropriate power so that the organic pollutants on the mineral-radical hydrophobic porous adsorbent inside the first adsorption column can be degraded;
5) Close the microwave generator and disconnect it from the microwave coil on the first adsorption column when the organic pollutants inside the first adsorption column are degraded completely;
6) After the second adsorption column adsorbs the organic pollutants fully, switch the water flow to the intake of the first reactor, start up the microwave generator, connect it to the microwave coil on the second adsorption column, and adjust the microwave emitting energy to an appropriate power, degrade the organic pollutants on the mineral-radical hydrophobic porous adsorbent inside the second adsorption column by way of microwave induction, regenerate the second adsorption column, close the microwave generator and disconnect it from the microwave coil on the second adsorption column;
7) Repeat Steps 2) to 6) until the organic wastewater inside the water container is treated completed.

As further improvement in the above technical scheme, in Step 1), the mineral-radical hydrophobic porous adsorbent mentioned is dealuminized HY zeolite.

As further improvement in the above technical scheme, in Step 1), the first adsorption column and the second adsorption column mentioned are components made of quartz material.

As further improvement in the above technical scheme, in Step 1), the first adsorption column is set inside a cavity made of aluminum and the second adsorption column is also set inside a cavity made of aluminum.

As further improvement in the above technical scheme, in Step 2), the velocity of organic wastewater flowing into the first reactor and the second reactor can be controlled via the total control valve.

As further improvement in the above technical scheme, in Step 3), the interval for testing the concentration of organic pollutants in the water flowing out of the outlet of the reactor is an hour.

The advantageous effects of the invention: In the invention, with the technologies of hydrophobic mineral coupling adsorption and microwave degradation, organic pollutants can be removed from water efficiently, and the degradation process and carrier can be circulated. The pollutants can be mineralized into non-toxic and harmless micromolecular substance completely. The invention can be applied in the pollution control for ground water, surface water and drinking water.

In the invention, hydrophobic porous mineral boasts a big adsorption capacity, orderly hole structure, and strong hydrophobicity, and it can adsorb the organic pollutants in water selectively at a high efficiency. Moreover, the material does not absorb microwave, so the hole structure will not be damaged during the process of degradation and regeneration.

The invention can be applied in the treatment of a variety of water-soluble polar organic pollutants.

BRIEF INTRODUCTION OF THE DRAWINGS

The invention will be further described in combination with drawings and embodiments in the following section.

FIG. 1 is the structure drawing of the equipment for implementing the method in the invention.

DETAILED DESCRIPTION OF THE PREFERRED EMBODIMENTS

The application of the invention in the treatment of organic pollutants in organic wastewater is further detailed below by combining the attached drawings.

In reference to FIG. 1, the method to remove organic pollutants through coupling microwave degradation based on microporous mineral adsorption consists of the following steps:
1) Fill mineral-radical hydrophobic porous adsorbent into the first adsorption column (7) and the second adsorption column (9), with a layer of microwave coil wrapping on the external surface of both of the two columns respectively;
2) Start up the water pump (1), draw out the organic wastewater from water container, remove the insoluble substance through the filtering apparatus (2), enter the first reactor (6) through the intake of the first reactor (6) after going through the total control valve (3), flow meter (4), and changeover valve (5), stay inside the first adsorption column (7) in the reactor for a period long enough so that the organic pollutants can reach a balance with the adsorption of mineral-radical hydrophobic porous adsorbent, and lead the treated wastewater from the outlet of the first reactor (6);
3) Test the concentration of organic pollutants in the water flowing out of the outlet of the first reactor (6) at intervals, start up the changeover switch (5) to switch the water flow to the intake of the second reactor (8) when the concentration reaches the preset value, and adsorb organic pollutants with the second adsorption column (9) inside the second reactor (8);
4) Start up the microwave generator (10), connect it to the microwave coil on the first adsorption column (7), and adjust the microwave emitting energy to an appropriate power so that the organic pollutants on the mineral-radical hydrophobic porous adsorbent inside the first adsorption column (7) can be degraded;
5) Close the microwave generator (10) and disconnect it from the microwave coil on the first adsorption column (7) when the organic pollutants inside the first adsorption column (7) are degraded completely;
6) After the second adsorption column (9) adsorbs the organic pollutants fully, switch the water flow to the intake of the first reactor (7), start up the microwave generator (10), connect it to the microwave coil on the second adsorption column (9), and adjust the microwave emitting energy to an appropriate power, degrade the organic pollutants on the mineral-radical hydrophobic porous adsorbent inside the second adsorption column (9) by way of microwave induction, regenerate the second adsorption column (9), close the microwave generator (10) and disconnect it from the microwave coil on the second adsorption column (9);
7) Repeat Steps 2) to 6) until the organic wastewater inside the water container is treated completed.

As a further preferred embodiment, in Step 1), the mineral-radical hydrophobic porous adsorbent mentioned is dealuminized HY zeolite. Dealuminized HY zeolite is selected as the adsorbent. Boasting a big specific surface area, a big adsorption capacity, an orderly hole structure, and a suitable aperture, the material has a high adsorption selectivity, and it can adsorb the target organic pollutants selectively but get rid of the interference of macromolecular organic matter like humic acid. Meanwhile, with a high hydrophobicity, the material can avoid the holes from being blocked by the water cluster formed due to the adsorption of a large amount of water inside the mineral holes, and the blockage will hinder the adsorption of target organic pollutant molecules.

As a further preferred embodiment, in Step 1), the first adsorption column (7) and the second adsorption column (9) mentioned are components made of quartz material. The adsorption column is made of quartz material, which does not absorb microwave and can resist high temperature, thus avoiding the energy loss due to the absorption of the adsorption column. With microwave coil wrapped on its external surface, the adsorption column can achieve the complete degradation of pollutants and regeneration of dealuminized HY zeolite simultaneously after being heated by the microwave and reaching saturation. The microwave heating is easy to be controlled automatically and it boasts such advantages as high selectivity, internal heating, fast rising rate, and high heating efficiency. The organic pollutant molecules in water adsorbed to the mineral micropores will vibrate and have their temperature risen quickly under the microwave and then will be degraded into non-toxic and harmless micromolecular substance. The dealuminized HY zeolite selected can barely absorb microwave, which can help bring into full play the energy and make the microwave energy have a better penetrability to act on organic matter molecules directly. Meanwhile, it can reduce the damage to mineral material caused by microwave and improve the utilization efficiency of material.

As a further preferred embodiment, in Step 1), the first adsorption column (7) is set inside a cavity made of aluminum and the second adsorption column (9) is also set inside a cavity made of aluminum. After the microwave generator (10) gets started, the microwave coil conducts the microwave energy to the adsorption column. An insulation layer made of aluminum silicon is covered over the coil, and the first adsorption column (7) and the second adsorption column (9) are set inside a cavity made of aluminum respectively. With the reflection of metal, the microwave energy can be allocated evenly inside the reactor and prevent the microwave from diffusing and leaking outside.

As a further preferred embodiment, in Step 2), the velocity of organic wastewater flowing into the first reactor (6) and the second reactor (8) can be controlled via the total control valve (3).

As a further preferred embodiment, in Step 3), the interval for testing the concentration of organic pollutants in the water flowing out of the outlet of the reactor is an hour.

The invention will be further described below in combination with embodiments:

Embodiment 1

Atrazine is one of the most important herbicides which are in the most extensive application in the world now. With a stable structure and high water solubility, however, it is hard to be degraded and the process for it to be mineralized by microorganisms is very slow. As a result, it seriously threatens the water ecological environment and the source of drinking water for human beings. Taking 10 ppm atrazine water solution as the control target, the embodiment uses dealuminized HY zeolite as the adsorbent. The molecular diameter of atrazine is 0.54 nm, and HY zeolite, with apertures ranging from 0.74-1.2 nm, boasts a three-dimensional hole structure, a large specific surface area, a high hydrophobicity, and an orderly hole structure. Therefore, atrazine molecules can be adsorbed in the holes selectively and restricted, which is helpful for microwave-induced degradation. Convey the atrazine water solution into the first adsorption column (7) via the water pump (1), filtering apparatus (2), total control valve (3), and mass flow meter (4), test the concentration of atrazine at the outlet of the reactor every hour, switch the water flow to the second adsorption column (9) when the concentration reaches the preset value, open the microwave generator (10), connect it to the microwave coil on the first adsorption column (7) which reaches saturation, adjust the power to the suitable value, degrade the atrazine adsorbed inside the first adsorption column (7), and achieve the regeneration of adsorbent. As HY zeolite can barely absorb microwave, it avoids microwave radiation from damaging the structure of adsorbent and the damaged structure will lead to a low adsorption efficiency after regeneration. In this way, a major shortcoming of active carbon as adsorbent can be overcome, and the microwave energy can utilized in a better way. With a high polarity, atrazine molecules can absorb microwave to some extent. Under the function of microwave, the atrazine adsorbed in the micropores of zeolite will be pyrolyzed into non-toxic and harmless micromolecular substance such as $NH_3$ and $CO_2$. Close the microwave generator (10) and disconnect it from the microwave coil on the first adsorption column (7) when the regeneration of adsorbent inside the first adsorption column (7) finishes. After the second adsorption column (9) reaches saturation, switch the water flow to the first adsorption column (7) again. With the alternative service and regeneration of the two adsorption columns, the atrazine in water can be removed continuously. In the method, atrazine in water can removed at a high efficiency and degraded completely while no secondary pollution will be caused.

Embodiment 2

The embodiment of the invention is illustrated by removing 2,4-dichlorophenol, a typical chlorophenol compound in water. As an important pollutant in water and soil environment, chlorophenol compound is widely applied in pesticide, pharmacy and industry. Because chlorophenol structure is stable, it will take a long period to treat it in the conventional physical, biochemical or chemical oxidation process in an undesired efficiency. Therefore, how to treat the wastewater containing phenol has become a universal topic for such industries as environmental protection, printing and dyeing, and paper making. Taking 20 ppm 2,4-dichlorophenol water solution as the control target, the embodiment uses dealuminized HY zeolite as the adsorbent. As the molecule diameter of 2,4-dichlorophenol is similar to the hole size of dealuminized HY zeolite, 2,4-dichlorophenol molecules can be adsorbed in the zeolite holes selectively and restricted. Meanwhile, with a high polarity, 2,4-dichlorophenol is highly capable of absorbing microwave. Convey the 2,4-dichlorophenol water solution into the first adsorption column (7) via the water pump (1), filtering apparatus (2), total control valve (3), and mass flow meter (4), test the concentration of 2,4-dichlorophenol water solution at the outlet of the reactor every hour, switch the water flow to the second adsorption column (9) when the concentration reaches the preset value, open the microwave generator (10), connect it to the microwave coil on the first adsorption column (7) which reaches saturation, adjust the power to the suitable value, degrade the 2,4-dichlorophenol adsorbed inside the first adsorption column (7), and achieve the regeneration of adsorbent. As HY zeolite can barely absorb microwave, it avoids microwave radiation from damaging the structure of adsorbent and the damaged structure will lead to a low adsorption efficiency after regeneration. In this way, a major shortcoming of active carbon as adsorbent can be overcome, and the microwave energy can utilized in a better way. With a high polarity, 2,4-dichlorophenol can absorb microwave to some extent. Under the function of microwave, the 2,4-dichlorophenol adsorbed in the micropores of zeolite will be pyrolyzed into non-toxic and harmless micromolecular substance such as $NH_3$ and $CO_2$. Close the microwave generator (10) and disconnect it from the microwave coil on the first adsorption column (7) when the regeneration of adsorbent inside the first adsorption column (7) finishes. After the second adsorption column (9) reaches saturation, switch the water flow to the first adsorption column (7) again. With the alternative service and regeneration of the two adsorption columns, the 2,4-dichlorophenol in water can be removed continuously. In the method, 2,4-dichlorophenol in water can removed at a high efficiency and degraded completely while no secondary pollution will be caused.

The invention is not restricted to the above embodiments, which detail the desirable methods to implement the invention. Technical personnel who know the field well may have a plurality of variants and substitutions in the precondition of not violating the idea of the invention. These equivalent variants or substitutions therefore also fall into the scope restricted in the claims of the invention.

The invention claimed is:

1. A method to remove organic pollutants from organic wastewater through coupling microwave degradation based on microporous mineral adsorption comprising:
   1) Filling a first adsorption column of a first reactor and a second adsorption column of a second reactor with mineral-radical hydrophobic porous adsorbent, wherein the mineral-radical hydrophobic porous adsorbent is dealuminized HY zeolite, each of said first and second adsorption columns having a layer of microwave coil wrapping on the external surface thereof;
   2) Starting up a water pump, drawing out the organic wastewater from a water container, pumping the organic wastewater through a filtering apparatus to remove insoluble substances from the organic wastewater pumping the filter wastewater through an intake of the first reactor and into the first adsorption column of the first reactor after going through a total control valve, a flow meter, and a changeover valve, and staying inside the first adsorption column in the first reactor for a period of time long enough so that the organic pollutants can reach adsorptive equilibrium with the mineral-radical hydrophobic porous adsorbent, and leading the treated wastewater from the outlet of the first reactor;
   3) Testing the concentration of the organic pollutants in the water flowing out of the intake of the first reactor at intervals, actuating a changeover switch to switch the filtered wastewater flow to an intake of the second reactor when the concentration reaches a preset value, and adsorbing the organic pollutants with the second adsorption column inside the second reactor;
   4) Starting up a microwave generator, connecting it to the layer of microwave coil on the first adsorption column, and adjusting the microwave emitting energy to an appropriate power level so that the organic pollutants on the mineral-radical hydrophobic porous adsorbent inside the first adsorption column can be degraded;
   5) Shutting down the microwave generator and disconnecting it from the microwave coil on the first adsorption column when the organic pollutants inside the first adsorption column are degraded completely;
   6) After the second adsorption column adsorbs the organic pollutants fully, switching the water flow back to the intake of the first reactor, re-starting up the microwave generator, connecting it to the layer of microwave coil on the second adsorption column, and adjusting the microwave emitting energy to an appropriate power level, degrading the organic pollutants on the mineral-radical hydrophobic porous adsorbent inside the second adsorption column by way of microwave induction, regenerating the second adsorption column, shutting down the microwave generator and disconnecting it from the layer of microwave coil on the second adsorption column; and
   7) Repeating Steps 2) to 6) until the treatment of the organic wastewater inside the water container is completed.

2. The method of claim 1, wherein the first adsorption column and the second adsorption column are made of a quartz material.

3. The method of claim 1, wherein, in Step 1), the first adsorption column is set inside a cavity made of aluminum and the second adsorption column is set inside a cavity made of aluminum.

4. The method of claim 1, wherein, in Step 2), a velocity at which the organic wastewater flows into the first reactor and the second reactor is controlled via the total control valve.

5. The method of claim 1, wherein, in Step 3), the intervals last for a time period of one hour.

* * * * *

UNITED STATES PATENT AND TRADEMARK OFFICE
CERTIFICATE OF CORRECTION

| | |
|---|---|
| PATENT NO. | : 9,073,765 B2 |
| APPLICATION NO. | : 13/884996 |
| DATED | : July 7, 2015 |
| INVENTOR(S) | : Hefa Cheng and Erdan Hu |

It is certified that error appears in the above-identified patent and that said Letters Patent is hereby corrected as shown below:

In the claims,

Claim 1 (column 7, lines 36 and 37)

"...insoluble substances from the organic wastewater pumping the filter..." should read --...insoluble substances from the organic wastewater, pumping the filtered...--

Signed and Sealed this
Tenth Day of November, 2015

Michelle K. Lee
*Director of the United States Patent and Trademark Office*